Patented Dec. 23, 1941

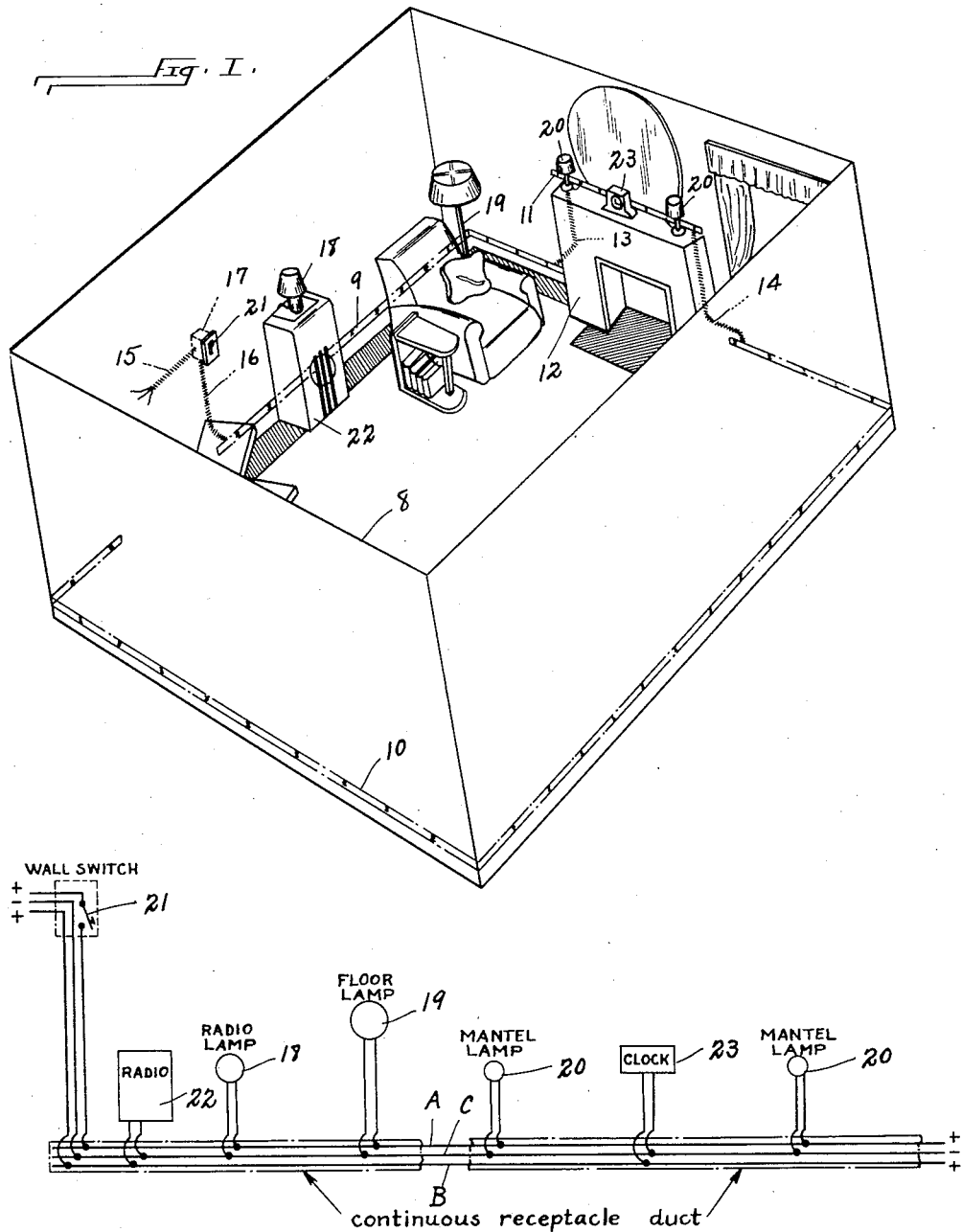

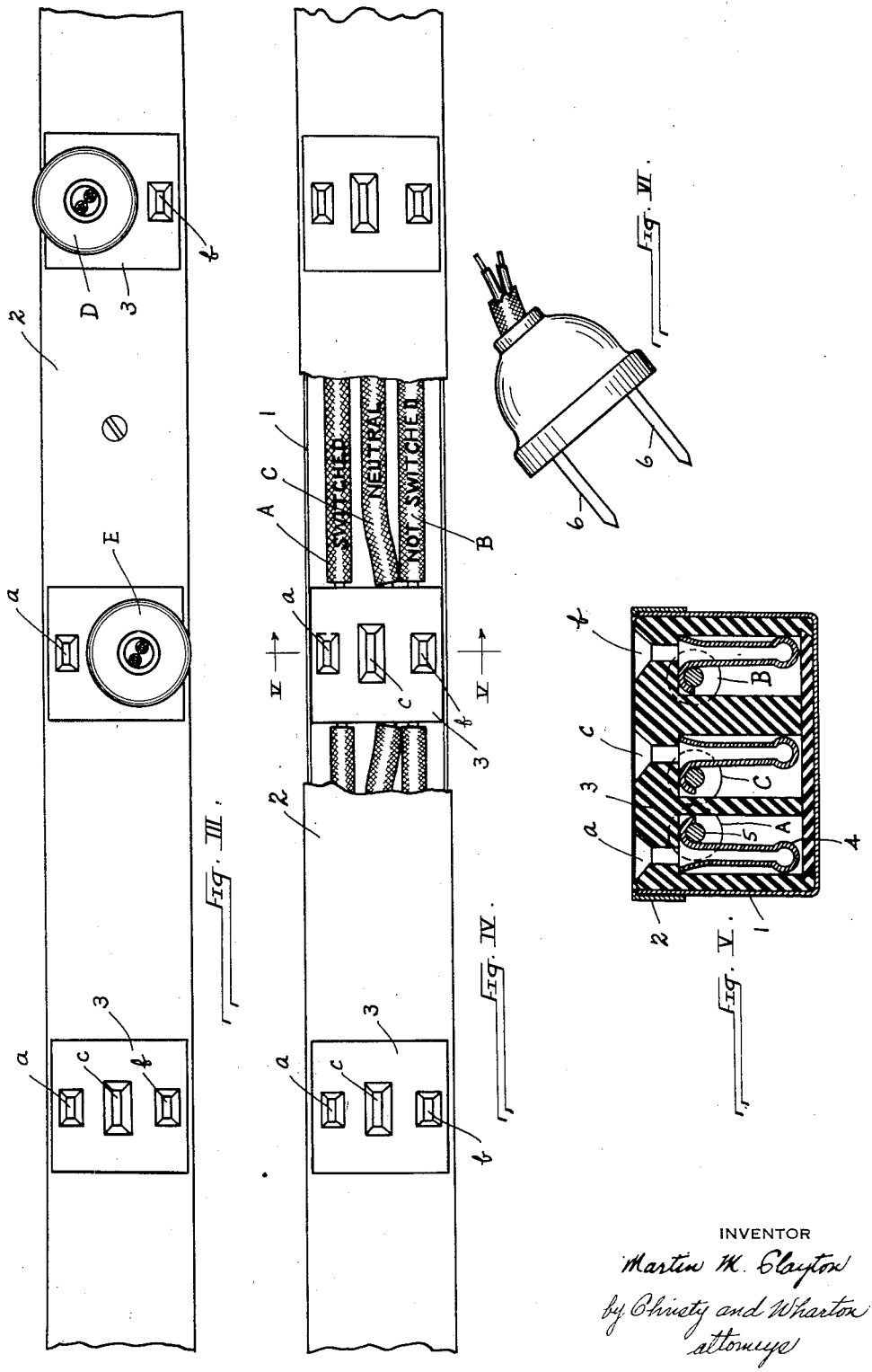

2,267,080

UNITED STATES PATENT OFFICE 2,267,080

RECEPTACLE SYSTEM

Martin M. Clayton, Pittsburgh, Pa., assignor to National Electric Products Corporation, a corporation of Delaware Application February 13, 1939, Serial No. 256,244

4 Claims. (Cl. 171—97)

This invention relates to an electrical outlet system.

In installations which involve lengths of duct, having therein parallel elongate electrical conductors and providing access at a plurality of longitudinal regions for the making of contact with their contained conductors, the entire length of the installation is commonly under the control of a single switch. This is an undesirable feature in an outlet duct arranged to provide a plurality of readily accessible outlets, since the primary reason for the installation of such duct is one of convenience in connecting fixtures, or attachments, in any region along the lengths of duct. For example, if an outlet duct be in a room having therein floor and table lamps, and also containing a radio, electric clock, or other attachment which is to be continuously energized, it is necessary to operate switches associated with the lamps themselves in order that the continuously energized attachments may be kept active independently of the occasional switching of the lights.

In installations which provide for the independent switching of any individual receptacle, or group of receptacles, forming elements of a multiple outlet duct installation, the selectivity is in longitudinally arranged regions throughout the length of the installation; and it is necessary, therefore, to predetermine the longitudinal regions of the outlet duct which are uninterruptedly energized and those regions which are to be intermittently energized. This requires local switching in any interchange of attachments, as for example, in an interchange between an electric clock and a floor lamp, and since certain attachments like a clock are maintained in the same position throughout long periods of time, it lessens the accessibility of the duct for energizing occasional attachments, such as floor lamps, which are frequently moved from place to place. It is unduly expensive, and in many associations unsightly, to employ two ducts which are independently controllable. It is also undesirable to provide duct of excessive width or depth.

To the end that these problems may be solved, I provide an attachment duct containing in compact and efficient arrangement two circuits susceptible of independent control, correspondingly to give group control of attachments connected respectively with the two circuits.

In the accompanying drawings Fig. I is an isometric, phantom view of the walls and interior of a room; showing an installation of my two-circuit receptacle duct, and showing two groups of attachments of different type electrically connected with the two-circuit duct.

Fig. II is a diagrammatic view, illustrating more clearly the electrical connection of the two groups of attachments to the two circuits of the duct.

Fig. III is a fragmentary plan view of my two-circuit receptacle duct, showing attachment plugs inserted to make electrical connection with the two independent circuits of the duct.

Fig. IV is a fragmentary plan view of the two-circuit duct, showing the cover of the duct partially broken away to expose the circuit conductors of the duct.

Fig. V is a cross sectional view through the two-circuit duct, taken through a receptacle in the plane of the section line V—V of Fig. IV.

Fig. VI is a side elevation of an attachment plug of standard structure and size, showing the plug adjacent the cross-sectional showing of a receptacle of the duct presented by Fig. V, in order to illustrate the cooperative effect of an attachment plug of that sort with a duct receptacle, selectively to make electrical connection with either of the two independent circuits available at the receptacle.

Referring to the drawings, the fragmentary length of the duct of my two-circuit system shown in Figs. III and IV consists of a formed metallic channel, designated by reference numeral 1, which is approximately rectangular in cross-section, and which is equipped with a cover 2 windowed at spaced intervals to expose a plurality of receptacles 3. Within the cavity of the metallic channel three longitudinally arranged conductors A, B, and C are mounted in the receptacles 3, which latter are of insulating material and are shown as molded structures.

At each of the receptacles, which insulate the contact-making regions of the conductors from the metallic channel, all three of the conductors A, B and C are exposed for the making of electrical connection therewith. Each of the conductors, thus installed, carries a plurality of contact clips 4, which are arranged along the conductors in a spacing corresponding to the desired spacing of receptacles in the channel, and the spacing of the windows in the cover 2 which expose the receptacles. In the detail showing of Fig. V, which exemplifies a preferred form of receptacles and arrangement of conductors and contact clips, one of the contact clips 4 is shown as attached to a bared region 5 of each of the duct conductors A, B, and C. Each receptacle has therein spaced openings $a$, $b$, and $c$, which give access to the contact clips 4 housed in the receptacle; and as the receptacle lies in the channel of the duct, these openings form a transverse series, aligned with each other transversely of the duct, and spaced apart a distance equal to the standard spacing of the prongs of an attachment plug. Desirably, as shown, the prong-receiving opening c is made of somewhat greater length than is common, in order that it may receive the broad prong of a polarized plug constructed with prongs of different width.

By reference also to Fig. V, it will readily be seen that the prongs 6 of an attachment plug, which prongs are of standard spacing, may be selectively inserted into the receptacle in either one of two alternate positions. Thus they may be inserted in the prongs' openings a and c to enter the contact clips associated with the conductors A and C, or may be inserted in the prong-receiving openings b and c to enter the contact clips associated with the conductors B and C. In either position in which the prongs of the attachment plug are inserted, connection is made to the common conductor wire C.

Considering the electrical arrangement of the two-circuit duct of the system, both the conductors A and B are positively and similarly energized, while conductor C is a neutral conductor. The conductors A and C, thus provide the elements of an electrical circuit, which may be completed by connecting an attachment by way of receptacle openings a and c to the contact clips of those conductors. This connection is shown by the attachment plug D in Fig. III of the drawings. Similarly, a second, and independent, circuit may be completed by means of an attachment plug making contact with the conductors B and C, by way of the receptacle openings b and c. In Fig. III, an attachment plug E is shown in position to complete such latter circuit. In both such circuits the conductor C provides a return line common to both circuits.

Referring generally to the system, illustrated particularly in Figs. I and II of the drawings, it may initially be observed that since the system has two electrically independent circuits, these two circuits are independently controllable, by providing means for making and breaking continuity of either or both of the energized conductors A and B. In Figs. II and IV the conductor A is clearly shown as switch controlled, and the conductor B as unswitched. In Fig. I there are shown reaches of the duct or strip mounted in, or on, the wall 8 of a room, and designated by reference numerals 9 and 10. A third reach 11 of the strip is shown as mounted above a mantel 12, and electrically connected in the system by cable reaches 13 and 14. The feed elements of the system are shown as cable reaches 15 and 16 leading respectively to a junction and switch assembly 17, and from such assembly to feed connection in the duct.

If then the arrangement of Fig. I be considered in connection with the showing of Fig. II, it will be apparent that there is provided by the duct a circuit including the conductors A and C, to which a group of attachments including the lamp 18, lamp 19, and lamps 20 are connected. This duct circuit is controlled by switch 21 in the junction and switch assembly 17 (see Fig. II), so that a group control of the attachments exemplified by these three lamps is had. The other duct circuit, including the conductors B and C, independently provides energization for a second group of attachments exemplified by radio 22, and electric clock 23. Desirably, but not necessarily, the circuit provided by the duct, and including the duct conductors B and C is also provided with electrical switch control, such as a second wall switch (not shown). Such control means may, without detriment to the utility of the system, be omitted when it is to be anticipated that the instrumentalities forming one group of attachments electrically connected in the system will be all such as may desirably be energized continuously. The duct system as a whole provides two circuits, with selective control of the two circuits and corresponding group control of attachments connected respectively with the two circuits.

The multiple outlet duct system of my invention thus provides a flush, outwardly accessible supply of electrical energization giving peculiarly great flexibility in service. Thus, in the exemplary arrangement of grouped attachments shown, all the lamps as a group may be energized and de-energized at the wall switch 21, without disturbing the continuity of energization of the radio 22 and electric clock 23. Also the various attachments may be rearranged at will, throughout the entire installation of the system, since each receptacle optionally provides outlet for either of the two circuits of the system. Also, if so desired, an attachment (for example a lamp) may at any receptacle be changed from either circuit to the other, in accordance as it may or may not be wished usually to control the attachment by its own physically associated switch.

The application herein constitutes a continuation in part of my co-pending application Serial No. 184,183, filed January 10, 1938.

I claim as my invention:

1. In an electrical outlet system the combination of three electrical conductors, two of which are energized and the third of which is a return conductor, with receptacles organized to receive and closely to space the three said conductors, three prong-receiving openings in the receptacles spaced to make contact by the prongs of a two-prong attachment plug with one energized conductor and the return conductor or with the other energized conductor and the return conductor alternatively to complete at the receptacle either one of two alternative electrical circuits, and a switch associated with at least one of the said energized conductors to establish or interrupt the electrical continuity thereof and to give control of the circuit part of which the said switched conductor is made by an attachment plug of the above-specified sort.

2. In an electrical outlet system the combination of three electrical conductors two of which are energized and the third of which is a return conductor, with receptacles organized to receive and closely to space the three said conductors, three prong-receiving openings in the receptacles spaced from each other a distance equal to the standard spacing between the prongs of a conventional two-prong attachment plug to make contact by the prongs of a two-prong attachment plug with one energized conductor and the return conductor or with the other energized conductor and the return conductor alternatively to complete at the receptacle either one of two alternative electrical circuits, and a switch associated with at least one of the said energized conductors to establish or interrupt the electrical continuity thereof and to give control of the circuit part of which the said switched conductor is made by an attachment plug of the above-specified sort.

3. In an electrical outlet system the combination of three electrical conductors, two of which are energized and the third of which is a return conductor, with an extended length of duct or raceway housing the three conductors of the system, insulating structure within the raceway arranged to space the three said conductors close to each other for the making of contact between them by the prongs of an attachment plug and having therein groups of three prong-receiving openings spaced to provide access for the prongs of a two-prong attachment plug to the said conductors, the arrangement of the conductors and prong-receiving openings being such that with one prong of a two-prong attachment plug in contact with the return conductor of the system the other prong of the plug may alternatively be in contact with either of the two energized conductors to complete with either of the conductors one of two alternative electrical circuits, and a switch associated with at least one of the said energized conductors to establish or interrupt the electrical continuity thereof and to give control of the circuit part of which the said switched conductor is made by an attachment plug of the above-specified sort.

4. In an electrical outlet system the combination of three electrical conductors, two of which are energized and the third of which is a return conductor, with an extended length of duct or raceway housing the three conductors of the system, insulating structure within the raceway arranged to space the three said conductors close to each other for the making of contact between them by the prongs of an attachment plug and having therein groups of three prong-receiving openings spaced a distance equal to the standard spacing between the prongs of a conventional two-prong attachment plug to provide access for the prongs of an attachment plug of that sort to all the said conductors, the arrangement of the conductors and prong-receiving openings being such that with one prong of a two-prong attachment plug in contact with the return conductor of the system the other prong of the plug may alternatively be in contact with either of the two energized conductors to complete with either of the conductors one of two alternative electrical circuits, and a switch associated with at least one of the said energized conductors to establish or interrupt the electrical continuity thereof and to give control of the circuit part of which the said switched conductor is made by an attachment plug of the above specified sort.

MARTIN M. CLAYTON.